US007607896B2

(12) United States Patent
Leuthen et al.

(10) Patent No.: US 7,607,896 B2
(45) Date of Patent: Oct. 27, 2009

(54) SYSTEMS AND METHODS FOR POWER RIDE-THROUGH IN VARIABLE SPEED DRIVES

(75) Inventors: John M. Leuthen, Claremore, OK (US); Dick L. Knox, Claremore, OK (US); Tom G. Yohanan, Broken Arrow, OK (US); Jerald R. Rider, Catoosa, OK (US)

(73) Assignee: Baker Hughes Incorporated, Houston, TX (US)

( * ) Notice: Subject to any disclaimer, the term of this patent is extended or adjusted under 35 U.S.C. 154(b) by 306 days.

(21) Appl. No.: 11/463,836

(22) Filed: Aug. 10, 2006

(65) Prior Publication Data

US 2007/0263331 A1 Nov. 15, 2007

Related U.S. Application Data

(60) Provisional application No. 60/746,015, filed on Apr. 28, 2006.

(51) Int. Cl.
*F04B 49/06* (2006.01)

(52) U.S. Cl. .................................................. 417/44.1

(58) Field of Classification Search .................. 363/41, 363/37, 50, 74; 417/44.1; 318/434, 801, 318/479, 812; 361/78
See application file for complete search history.

(56) References Cited

U.S. PATENT DOCUMENTS

| | | | | |
|---|---|---|---|---|
| 4,626,763 A * | 12/1986 | Edwards | ..................... | 318/811 |
| 4,843,533 A * | 6/1989 | Roof et al. | ..................... | 363/55 |
| 5,099,918 A * | 3/1992 | Bridges et al. | ................. | 166/60 |
| 5,127,085 A * | 6/1992 | Becker et al. | ................ | 318/434 |
| 5,130,628 A | 7/1992 | Owen | | |
| 5,235,259 A * | 8/1993 | Dhindsa et al. | ............. | 318/434 |
| 5,420,778 A * | 5/1995 | Yoshino | ........................ | 363/41 |
| 5,450,306 A * | 9/1995 | Garces et al. | .................. | 363/41 |
| 5,465,202 A * | 11/1995 | Ibori et al. | ..................... | 363/37 |
| 5,754,419 A * | 5/1998 | Ho | ............... | 363/89 |
| 5,844,397 A * | 12/1998 | Konecny et al. | ............ | 318/811 |
| 6,005,362 A * | 12/1999 | Enjeti et al. | .................. | 318/479 |
| 6,043,995 A * | 3/2000 | Leuthen | ....................... | 363/37 |
| 6,118,676 A * | 9/2000 | Divan et al. | ..................... | 363/34 |
| 6,150,736 A | 11/2000 | Brill | | |
| 6,313,600 B1 * | 11/2001 | Hammond et al. | ........... | 318/798 |
| 6,362,585 B1 * | 3/2002 | Hiti et al. | ..................... | 318/430 |
| 6,686,718 B2 * | 2/2004 | Jadric et al. | ................. | 318/801 |
| 7,005,829 B2 * | 2/2006 | Schnetzka | .................... | 318/801 |

(Continued)

*Primary Examiner*—Devon C Kramer
*Assistant Examiner*—Alexander B Comley
(74) *Attorney, Agent, or Firm*—Law Offices of Mark L. Berrier (57) ABSTRACT

Systems and methods for providing ride-through for interruptions in the power supplied to drives that are used to control equipment such as downhole submersible pumps. In one embodiment, a variable speed drive includes converter and inverter sections, a capacitor bank and a control system. The drive shuts down the converter section upon detecting a disruption in the AC input power and continues to generate output power by drawing on the energy stored in the capacitor bank. When the AC input power returns (or begins to return) to normal, the drive resumes operation of the converter section in a controlled manner (e.g., by presetting the firing angle of the SCR's in the converter to match the voltage across the capacitor bank.) The drive thereby limits the current that recharges the capacitor bank and prevents sudden inrushes of current that could damage the drive.

16 Claims, 6 Drawing Sheets

U.S. PATENT DOCUMENTS 7,081,734 B1 * 7/2006 Jadric et al. .................. 318/801
7,116,067 B2 * 10/2006 Ma et al. ............... 318/400.05
2005/0281681 A1 * 12/2005 Anderson et al. ........ 417/44.11

* cited by examiner

Single phase diagram of a VSD in PWM mode

Fig. 2B

Single phase diagram of a VSD in six-step mode

SYSTEMS AND METHODS FOR POWER RIDE-THROUGH IN VARIABLE SPEED DRIVES

CROSS-REFERENCE TO RELATED APPLICATIONS

This application claims the benefit of U.S. Provisional Patent Application 60/746,015, filed Apr. 28, 2006, which is incorporated by reference as if set forth herein in its entirety.

BACKGROUND

1. Field of the Invention

The invention relates generally to electrical control systems, and more particularly to systems and methods for controlling variable speed drives of the type used in connection with downhole oil production equipment.

2. Related Art

Crude oil is typically produced by drilling wells into oil reservoirs and the pumping the oil out of the reservoirs through the wells. Often, the oil is pumped out of the wells using electric submersible pumps. Electrical power is provided to electrical drive systems at the surface of the wells and, in turn, these drive systems provide the required electrical power to the pumps.

Normally, a single power source, such as a generator, will be used to provide electrical power to the drives for pumps in many different wells. As a result of the loading on the power source by the different pumps, as well as various other factors, the power supplied to the pumps' drives may be subject to variations and even interruptions.

While the variations in the power being supplied to the pump drives may be relatively minor, and the interruptions relatively short, they may nevertheless be very disruptive with respect to the operation of the pumps, particularly when the pumps are submersible pumps operated in deep wells. The reason for this is that, since submersible pumps must fit in a well, they must be long and narrow. Consequently, they have very little inertia and, when there is a power variation/interruption, these pumps slow down and stop very quickly in comparison to pumps which have more inertia, such as surface pumps. The deceleration of the pump is even more pronounced in deep wells due to the large fluid column above the pump. Also, as the pump slows down, there will be some RPM below which the pressure produced by the pump is insufficient to support the column of fluid. Because of this, the fluid starts to fall back through the pump, which dramatically increases the torque required for continued forward rotation. This makes it necessary to stop the pump and wait for the column of fluid to drain back. The flowing of the fluid column back into the formation in some cases may take a few minutes, while in other cases it may take more than an hour. The delay in restarting the pump may be even longer because it may be necessary, if multiple pumps stop, to stagger the restart of each pump.

Because each well may normally produce hundreds or even thousands of barrels of oil in a day, the cost associated with a pump stopping and having to be restarted can be very high. There is therefore need to avoid such interruptions in production that are caused by variations and interruptions in the input power provided to the pumps' drives. Maintaining the operation of the pump during such interruptions is commonly referred to as "ride-through."

Conventionally, the need for ride-through has been addressed by increasing the amount of capacitance already present in the DC bus and insuring that the power supply for the controls maintains a nominal operating voltage for the required amount of time. This can work if the load has enough inertia so that the speed does not fall below some recoverable RPM. However, the energy consumed from the DC bus during the event will need to be replaced when the power system recovers. With an uncontrolled converter section, this results in a current inrush sufficient to blow fuses or damage components. Some mitigation of this problem can be accomplished by adding impedance between the AC line and the input of the drive, but this only helps for relatively shallow line transients.

It would therefore be desirable to provide systems and methods for providing ride-through of interruptions in the power supplied to the pumps' drives, while avoiding the disadvantages of conventional ride-through mechanisms.

SUMMARY OF THE INVENTION

This disclosure is directed to systems and methods for providing ride-through for interruptions in the power supplied to drives that are used to power, for example, downhole submersible pumps. In one particular embodiment, a variable speed drive suitable for, e.g., providing power to drive an electric submersible pump incorporates means to ride-through disruptions in the power supply to the drive and to continue providing power to the pump. The variable speed drive includes converter and inverter sections, as well as a capacitor bank and control systems. The drive shuts down the converter section upon detecting a disruption in the AC input power (a ride-through event) and continues to generate output power for the pump by drawing on the energy stored in the capacitor bank. When the AC input power returns (or begins to return) to normal, the drive resumes operation of the converter section in a controlled manner (e.g., by presetting the firing angle of the SCR's in the converter or presetting the torque integral in a partial integral controller to match the voltage across the capacitor bank.) The drive thereby limits the current that recharges the capacitor bank and prevents sudden inrushes of current that could damage the drive. If the AC input power does not return in a predetermined amount of time, or before the voltage across the capacitor bank reaches a minimum threshold, the drive shuts itself down.

Another embodiment comprises a method implemented in a drive for electrical equipment, such as a downhole submersible pump. The drive has a converter section, a capacitor bank and an inverter section, as well as a control system. The method comprises of detecting the beginning of a ride-through event, disabling the converter section of the drive, continuing to operate the inverter section using energy stored in the capacitor bank, detecting the end of the ride-through event, and resuming operation of the converter section in a controlled manner to prevent sudden inrushes of current to the capacitor bank. The beginning of a ride-through event may be detected by comparing a present RMS value of the AC input voltage to a historical (filtered) RMS value and detecting drops of, e.g., more than 10%. The end of the ride-through event may, for example, be detected as a return to 90% of the historical RMS value, or as an increase in the present RMS value for at least three cycles. Resuming controlled operation of the converter section may, for instance, consist of presetting the converter's SCR firing angle or integral controller signals to limit the amount of current generated by the converter. The values to which these parameters are preset may be based on the voltage across the capacitor bank.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for providing ride-through for interruptions in the power supplied to drives that are used to control pumps such as downhole submersible pumps.

In one embodiment, an electric submersible pump is controlled using a variable speed drive which incorporates means to ride-through disruptions in the power supply to the drive. The variable speed drive includes converter and inverter sections, as well as a capacitor bank and control systems. The drive receives AC input power (subject to interruptions and/or variations) and generates output power which is suitable for driving the pump. The drive is configured to detect disruptions in the supplied AC power, ride through these disruptions if possible, and thereby prevent at least some of the interruptions that would otherwise be experienced in the normal operation of the pump.

In this embodiment, the drive monitors the input power line to detect interruptions or variations on the line. If the input power is interrupted, or if there is a voltage drop that exceeds a threshold level, this signifies the beginning of a ride-through event. Upon detecting the beginning of a ride-through event, the control system of the drive shuts off the drive's converter section and draws energy from the capacitor bank to continue operation of the inverter section and thereby continue to provide power to the pump. If the disruption on the input line ends (or if the line begins returning to its normal voltage,) this signifies the end of the ride-through event. If the ride-through event is short enough to have maintained operation of the pump, the control system resumes operation of the converter in a controlled manner in order to avoid a sudden inrush of current that would otherwise damage the drive. The control system causes the drive to slowly recharge the capacitor bank and return to normal operating conditions.

Figure 1:
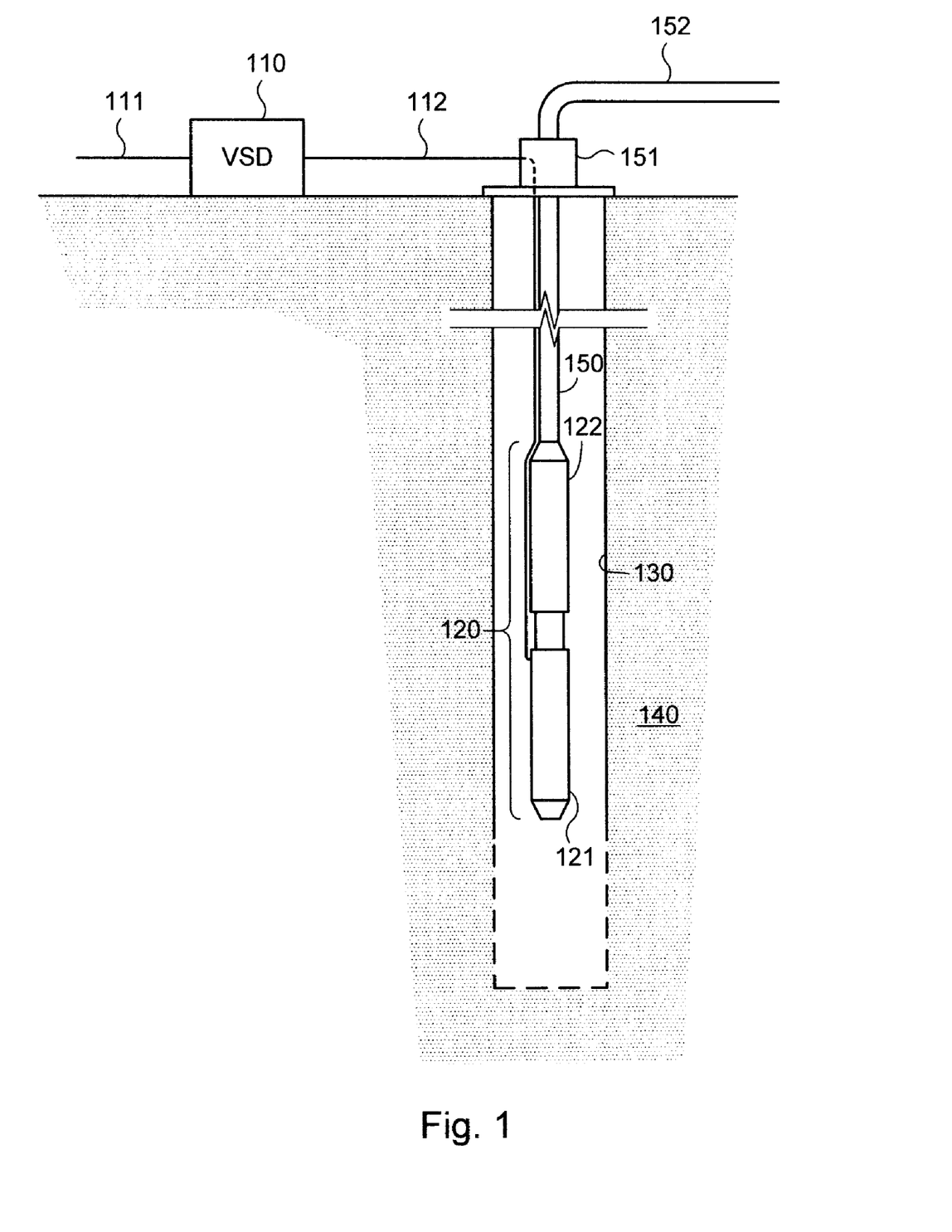
FIG. 1 is a diagram illustrating an electric submersible pump and control system in accordance with one embodiment.

Referring to FIG. 1, a diagram illustrating an electric submersible pump and control system in accordance with one embodiment is shown. In this embodiment, a variable speed drive 110 is coupled to an electric submersible pump 120. Pump 120 is positioned within a wellbore 130 which has been drilled into an oil-bearing geological structure 140. Wellbore 130 is cased and is perforated at the lower end of the well to allow oil to flow from the formation into the well.

Pump 120 is coupled to the end of tubing string 150. Pump 120 and tubing string 150 are lowered into the wellbore to position the pump in producing portion of the well (i.e., the perforated portion.) Pump 120 is then operated in order to pump oil from the producing portion of the well, through tubing string 150 to well head 151. The oil then flows out through production flow line 152 and into storage tanks (not shown in the figure.)

Pump 120 includes an electric motor section 121 and a pump section 122. (It should be noted that pump 120 may include various other components which will not be described in detail here because they are well known in the art and are not important to a discussion of the invention.) Motor section 121 is operated to drive pump section 122, which actually pumps the oil through the tubing string and out of the well. In this embodiment, motor section 121 uses an induction motor which is driven by variable speed drive 110. Variable speed drive 110 receives AC (alternating current) input power from an external source such as a generator (not shown in the figure) via input line 111. Drive 110 rectifies the AC input power and then produces output power that is suitable to drive motor section 121 of pump 120. This output power is provided to motor section 121 via drive output line 112, which runs down the wellbore along tubing string 150.

Figure 2A:
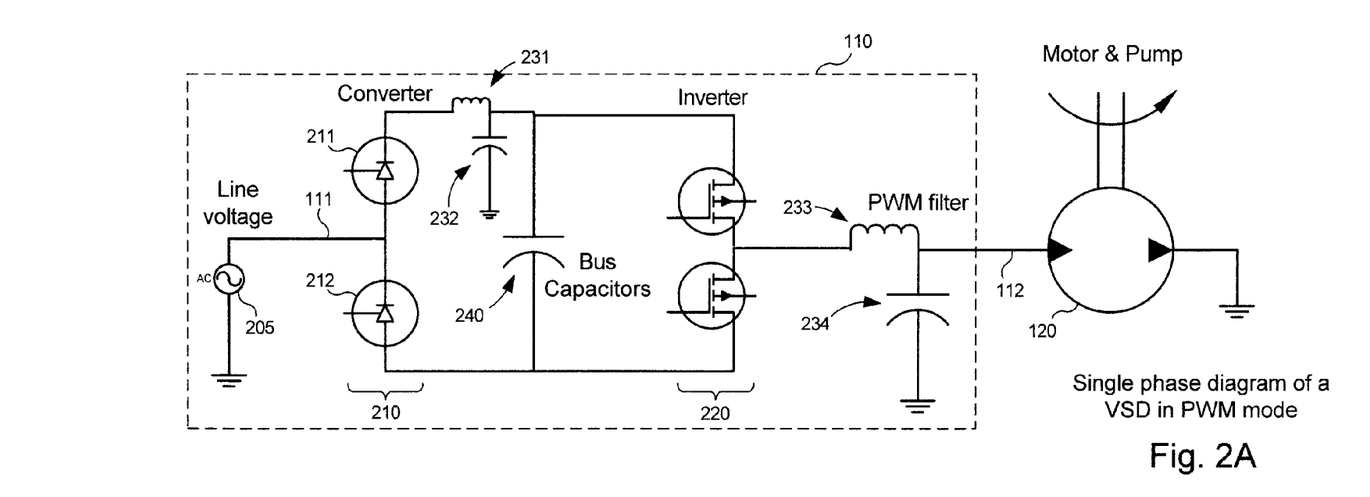
FIGS. 2A and 2B are diagrams illustrating the general structure of a variable speed drive in accordance with one embodiment.
Figure 2B:
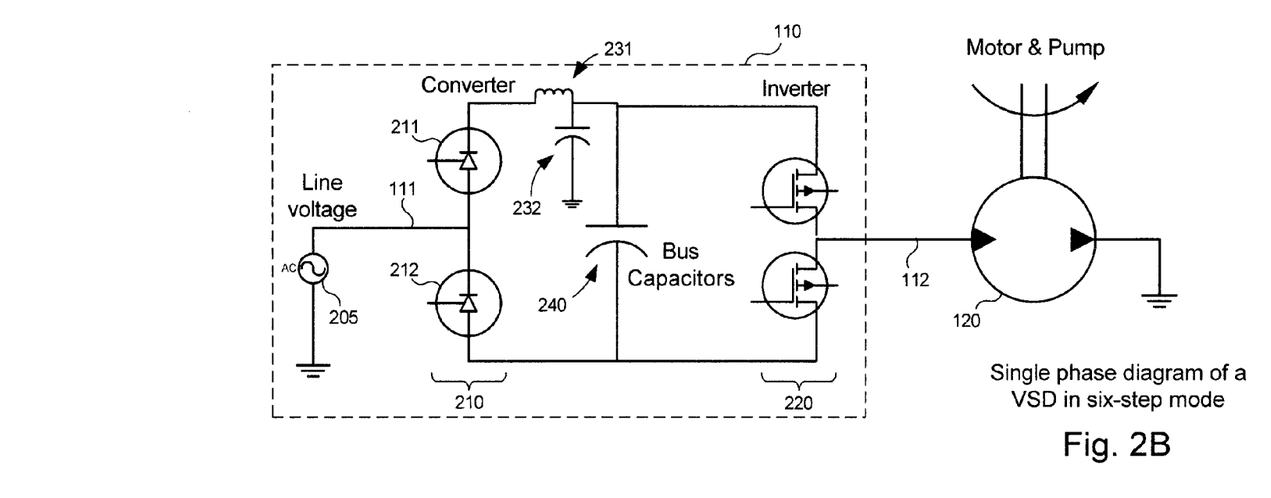

Referring to FIGS. 2A and 2B, a set of diagrams illustrating the general structure of a variable speed drive in accordance with one embodiment is shown. FIG. 2A shows the drive as used in a PWM mode, while FIG. 2B shows the drive in a six-step mode. It should be noted that the structure shown in this figure is simplified, and the drive may include components that are not explicitly depicted, or may have a more complex structure. For example, a similar variable speed drive structure is described in U.S. Pat. No. 6,043,995. It should also be noted that FIG. 2 shows a portion of the drive that includes components which are common to conventional variable speed drives.

Variable speed drive 110 includes a converter section 210 and an inverter section 220. The purpose of converter section 210 is to rectify the voltage received from AC source 205 on line 111. Converter section 210 generates DC (direct current) power which is passed through an LC filter consisting of inductor 231 and capacitor 232. The DC voltage generated by converter section 210 charges a capacitor bank 240 to a desired voltage. The desired voltage is achieved by controlling the operation of converter section 210. The voltage on capacitor bank 240 (the bus voltage) is then used to drive inverter section 220. The purpose of inverter section 220 is to connect the bus voltage to the output terminals in prescribed manners to generate various output waveforms. Examples of the types of output waveforms that may be generated by inverter section 220 are described in more detail in U.S. Pat. No. 6,043,995. The output power produced by inverter section 220 is filtered in the PWM mode by a PWM filter (an LC filter) consisting of inductor 233 and capacitor 234. The filtered output is then provided via output line 112 to pump 120 to drive its operation.

Converter section 210 and inverter section 220 operate according to control signals received from a control section of the variable speed drive. For example, the control section determines the timing with which the SCRs (silicon controlled rectifiers) of the converter section (e.g., 211 and 212) are turned on or "fired." This timing determines when, and for how long the voltage on input line 111 is applied to the bus, and thereby controls the bus voltage. If the SCRs are turned on as soon as the input line voltage goes positive, the SCRs will be switched on for the maximum amount of time, causing the bus voltage to move toward its maximum. If the switching on of the SCRs is delayed, they will be switched on for less than the maximum amount of time, and a lower bus voltage will be achieved. The control section of the variable speed drive similarly controls the operation of inverter section 220. The control section selects the desired output mode (e.g., standard PWM mode, six-step mode, or hybrid mode,) and adjusts the output voltage by varying appropriate factors. For instance, in the PWM mode, the bus voltage is set to maximum by firing the SCR at the earliest time and the output voltage is controlled by adjusting a scale factor of the output waveform called the modulation index. In the hybrid or six-step mode, the scale factor is set to 100 percent, and the output voltage is determined by the bus voltage which is controlled by the firing of the SCRs. In all three modes, the output frequency (and therfore the speed of the pump) is a function of the output voltage.

Figure 3:
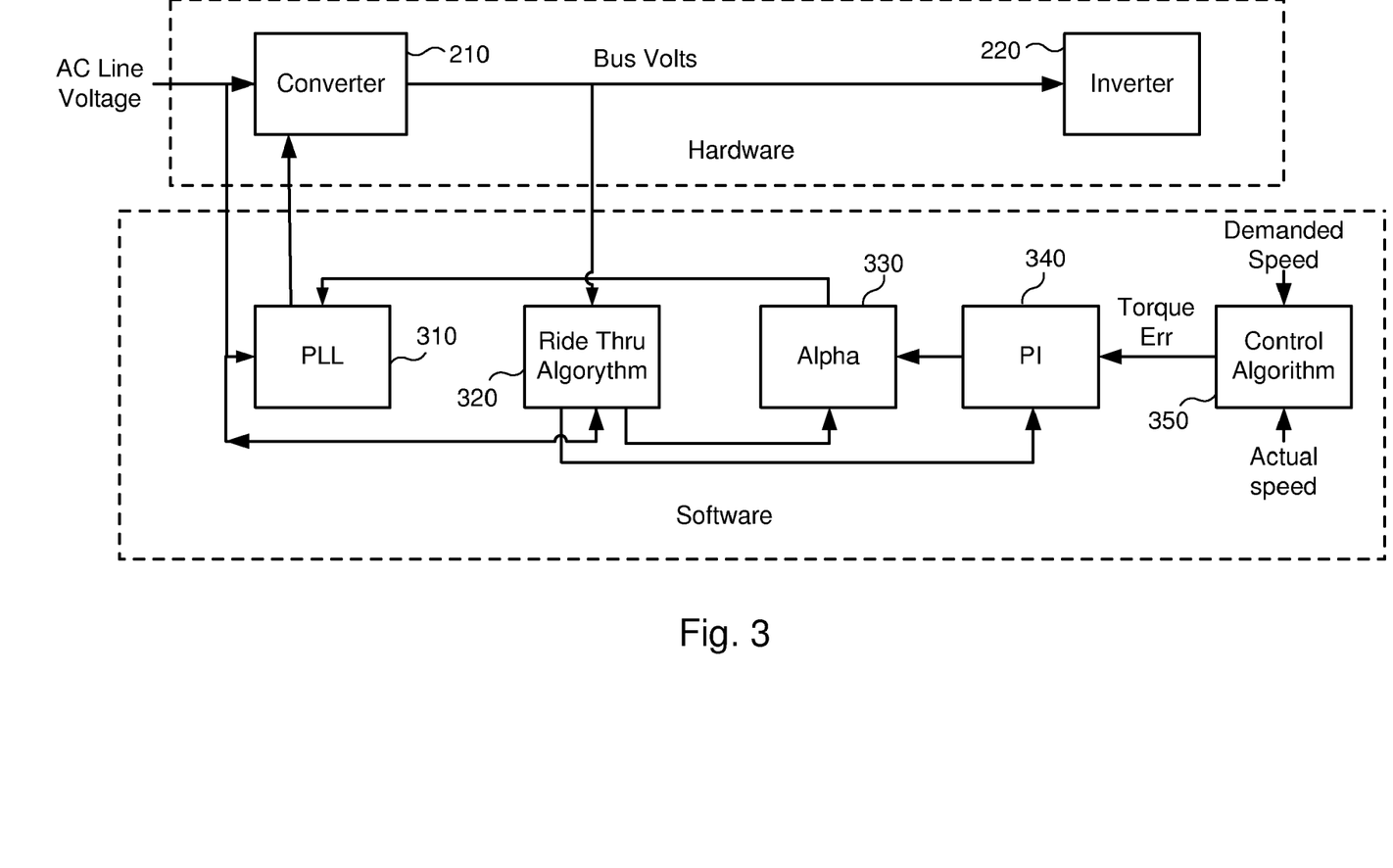
FIG. 3 is a block diagram illustrating the interrelationship of hardware and software in a variable speed drive according to one embodiment.

Referring to FIG. 3, a block diagram illustrating the interrelationship of hardware and software in a variable speed drive according to one embodiment of the invention is shown. In this figure, the components of the drive are broken into hardware and software components. The hardware components include converter section 210 and inverter section 220, which are coupled together by a bus. The software components include PLL (phase locked loop) controller 310, ride-through algorithm 320, alpha controller 330, proportional integral controller 340 and control algorithm 350. It should be noted that PLL controller 310, alpha controller 330, proportional integral controller 340 and control algorithm 350 are found in conventional drives. Ride-through algorithm 320, and the manner in which it interacts with these other software components are, however, unique.

As noted above, controller section 210 rectifies the AC voltage received on the input line and produces the DC bus voltage. As also noted above, the DC bus voltage is controlled by adjusting the timing with which the SCR's of the converter are turned on. This timing is defined with respect to the zero crossings of the input AC voltage. The zero crossings are the points at which the AC voltage is zero, crossing from a negative voltage to a positive voltage. As shown in FIG. 3, the input AC voltage is provided to PLL controller 310 so it can lock into phase with the input AC voltage. Only when it is phase-locked can PLL controller 310 accurately control the timing with which the SCR's are turned on.

The timing with which the SCR's of converter section 210 are turned on is adjusted by controlling alpha, which is the phase angle between the zero crossing of the AC input line voltage and the time at which the corresponding SCR is turned on. Thus, if alpha is zero, the SCR will be turned on as soon as the AC line voltage crosses zero and becomes positive. The SCR will therefore be turned on for the entirety of the positive half of the sinusoidal input voltage. On the other hand, if alpha is 180 degrees, the SCR will be completely out of phase with the sinusoidal input voltage, so it will effectively never be turned on. If alpha is set to a value between zero and 180 degrees, the SCR will be turned on for some portion of the positive input voltage. By setting alpha appropriately, the bus voltage generated by the converter can be controlled.

Conventionally, alpha is adjusted according to the output of proportional integral controller 340. The output of proportional integral controller 340 in turn depends upon a torque error signal received from control algorithm 350. The demand error signal is generated based on a desired pump speed (set by a user) and the actual pump speed. Thus, differences between the actual and desired pump speeds impact the computation of alpha. (or the modulation index, depending on the mode.) This can impact the bus voltage generated by the converter. If the actual pump speed is less than the desired speed, the demand error signal may cause alpha to decrease, thereby increasing the bus voltage and increasing the pump speed. If the actual pump speed is greater than the desired speed, the demand error signal may cause alpha to increase, thereby decreasing the bus voltage and consequently the pump speed. Conversely, in the PWM mode, changes in the pump speed will cause the modulation index to change while the bus voltage remains constant. It can be seen that, in all modes, the output voltage and frequency is a function of the output of the proportional integral controller 340, while the bus voltage is a function of alpha.

PLL controller 310, alpha controller 330, proportional integral controller 340 and control algorithm 350 control the operation of the variable speed drive under normal input power conditions. If there are no interruptions or significant variations in the input AC voltage (e.g., the RMS voltage does not drop by more than 10 percent,) ride-through algorithm 320 does not come into play. If, however, there are interruptions or significant variations in the input power, ride-through algorithm 320 detects these interruptions/variations and controls converter 210 to allow the drive to safely resume operation when the input power returns (or begins to return) to normal.

Figure 4:
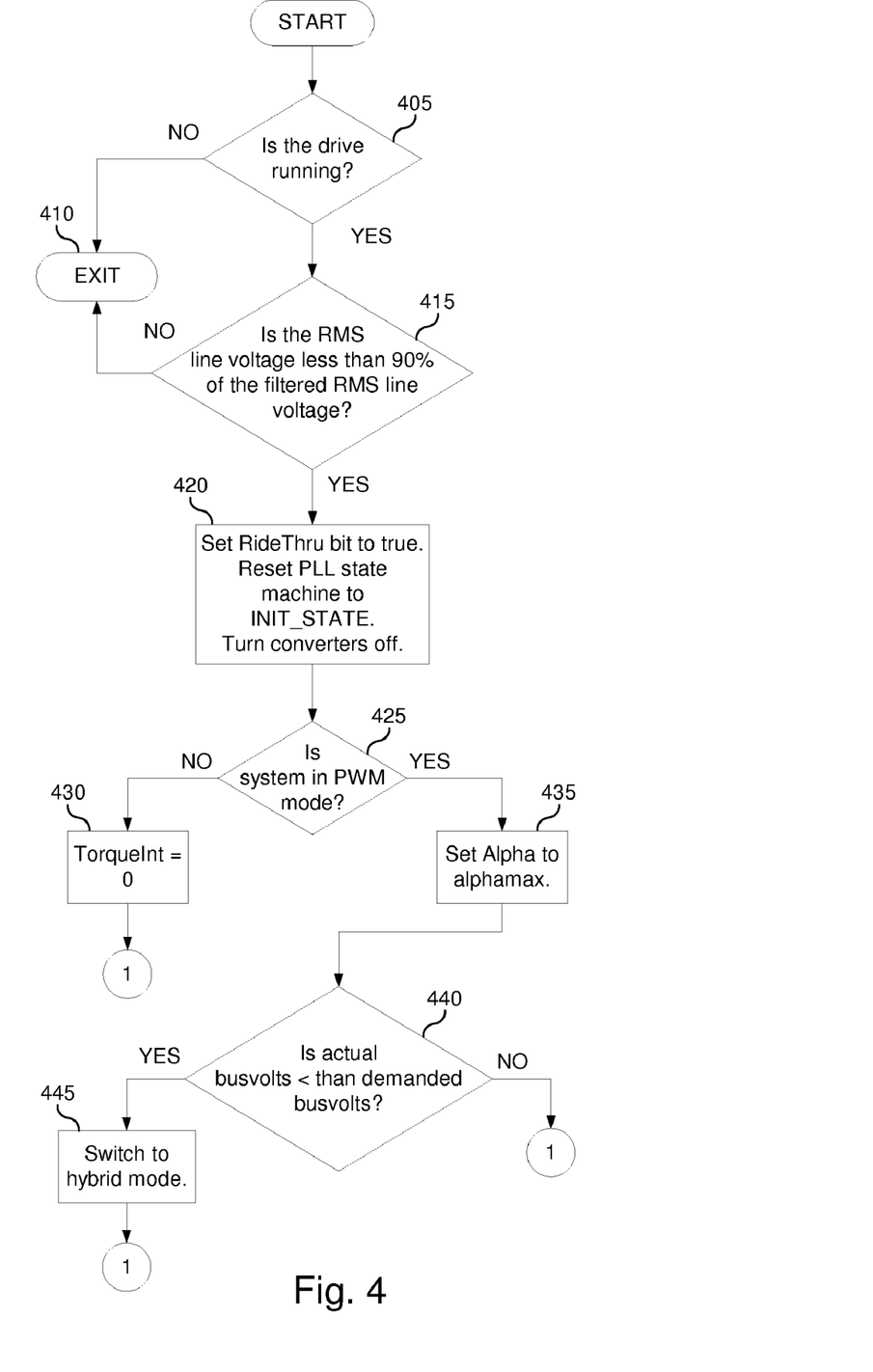
FIG. 4 is a flow diagram illustrating the operation of a ride-through algorithm at the beginning of a ride-through event in accordance with one embodiment.
Figure 5:
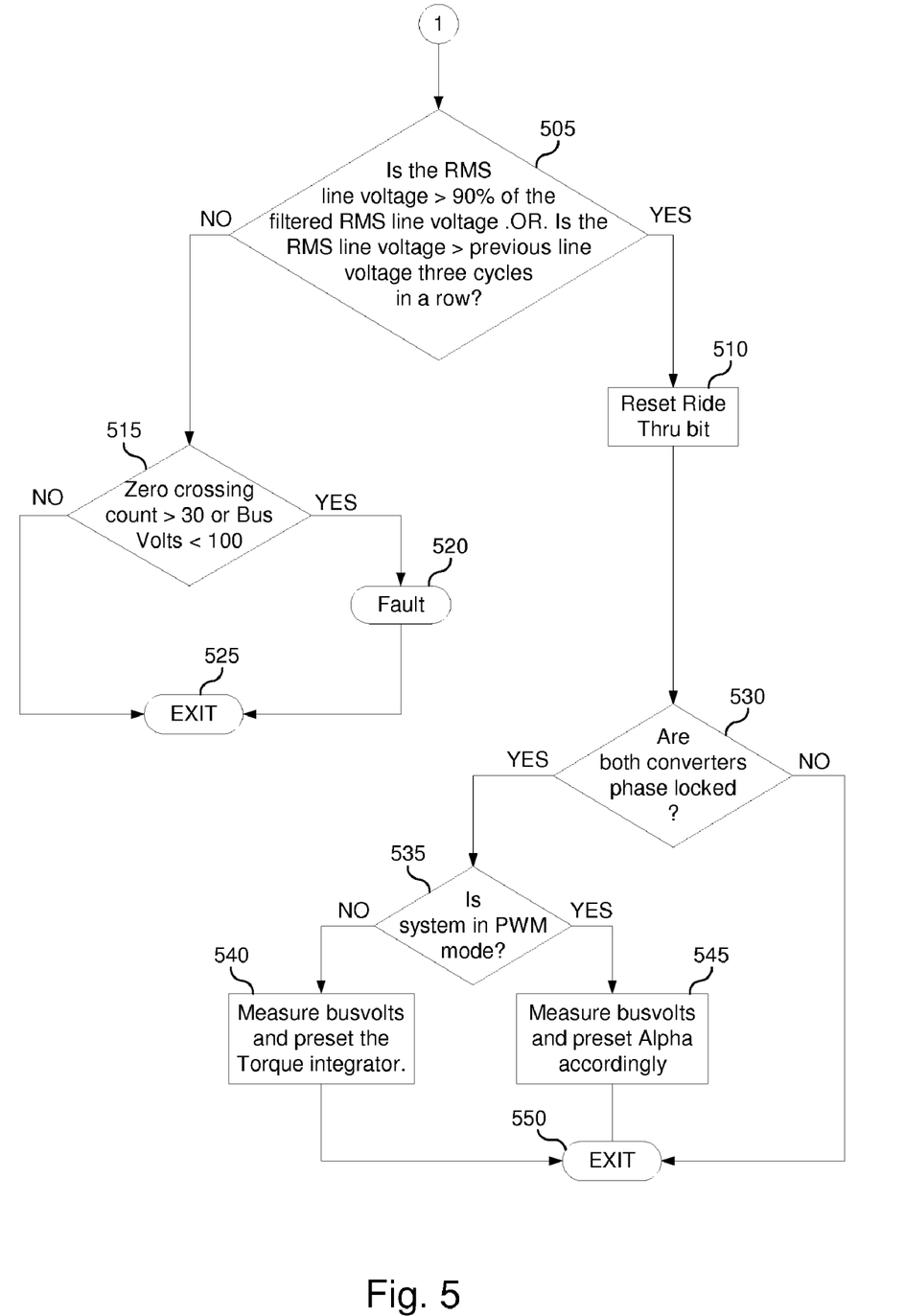
FIG. 5 is a flow diagram illustrating the operation of a ride-through algorithm at the end of a ride-through event in accordance with one embodiment.

Referring to FIGS. 4 and 5, a pair of flow diagrams illustrating the operation of ride-through algorithm 320 are shown. FIG. 4 depicts the operation of the algorithm corresponding to the beginning of a ride-through event, while FIG. 5 depicts the operation of the algorithm corresponding to the end of the ride-through event. Beginning at the top of FIG. 4, the algorithm first determines whether or not the drive is running (block 405.) If the drive is running, the algorithm then determines whether the RMS value of the input line voltage is less than 90% of a filtered RMS line voltage (block 415.) The filtered RMS line voltage represents a "historical" value of the input line voltage. This value is generated by simply low pass filtering the RMS line voltage with a time constant that is long enough to provide a slowly changing value with which the present line voltage can be compared to determine whether there is an interruption or variation in the voltage. If, at block 415, the line voltage is at least 90% of the filtered line voltage, the algorithm exits (410) and the drive continues operating normally. It should be noted that, although the algorithm as depicted in FIG. 4 exits if the line voltage is normal, the algorithm is restarted each cycle, so it could alternatively be shown as looping back to decision block 405. If, at block 405, the drive is not running, the algorithm exits (410,) and operation of the drive can be resumed in a conventional manner.

If the algorithm detects at decision block 415 that the RMS input line voltage is less than 90% of the filtered RMS line voltage, a ride-through event has begun. A ride-through bit is therefore set to indicate the event (block 420.) The drive also resets a PLL state machine to an initial state (the PLL state machine will be discussed in more detail below) and the converter section of the drive is turned off (420.) If the drive is not in PWM mode (block 425,) the demand error integral is set to zero (block 430) and the algorithm waits for the ride-through event to end (see FIG. 5.) If, the other hand, the drive is in PWM mode, alpha is set to its maximum value to effectively turn off the SCR's of the converter (block 435.) If, at decision block 440, the actual bus voltage is greater than that required to maintain the proper output voltage with a modulation index of 100 percent or less, the algorithm simply waits for the ride-through event to end (see FIG. 5.) If the actual bus voltage is instead less than the required voltage, the algorithm switches the drive to the hybrid mode (block 445) and then waits for the ride through event to end.

Referring to FIG. 5, the drive has already shut off the converter section and is waiting for the ride-through event to end. At this point, the algorithm monitors the RMS input line voltage and determines whether the input line voltage has returned, or is beginning to return to normal (block 505.) This is determined by comparing the RMS input line voltage to the filtered RMS voltage and determining whether the present value is greater than 90% of the filtered RMS value, or whether the present RMS line voltage has increased for three consecutive cycles. The first of these conditions indicate that the line voltage has returned to normal, while the second indicates that the input line voltage is beginning to return to normal.

If, at decision block 505, neither of the conditions indicating the end of the ride-through event is true, the algorithm determines whether it should continue to wait, or exit because the event has lasted too long to ride through. This determination is made at block 515, at which point the algorithm determines whether either of two conditions have been met. These conditions indicate that the ride-through event has lasted too long to avoid stopping the drive and the pump. The first of these conditions is having had more than 30 zero crossings. The second condition is that the bus voltage has dropped below 100 volts. Again, in this embodiment, once the bus voltage has been reduced to this level, the drive cannot maintain operation of the pump, so interruption of the pump's operation cannot be avoided. If either of these two conditions is met, the algorithm indicates a fault (block 520) and then exits (block 525.) If neither of the conditions is met, it is assumed that it may still be possible to maintain operation of the drive and pump through the ride-through event. As depicted in the figure, the algorithm exits at this point, but it should be noted that the exit corresponds to a return to block 505, where the algorithm continues to monitor the input line voltage to detect the end of the ride-through event. This could alternatively be shown as a direct return to block 505.

It should be noted that the conditions indicated in decision block 515 correspond to a particular embodiment, and the conditions indicating that a fault has occurred may vary in alternative embodiments. In particular, it is worth noting that the stated conditions (more than 30 zero crossings or less than 100 volts on the bus) were determined for an application involving an electrical submersible pump. As described above, these types of pumps have very little inertia. As a result, the amount of time that can pass and still be able to resume normal operation is limited by the amount of energy stored in the auxiliary bus capacitors 240. Surface pumps typically have much more inertia, so the fault conditions for applications using these pumps may be substantially longer in duration and/or lower in voltage.

Returning again to decision block 505, if either of the conditions indicating the end of the ride-through event is true, the ride-through bit is reset, indicating the end of the ride-through event (block 510.) As noted above, it is necessary for proper operation of the converter section of the drive that phase lock be established with the input line voltage. If the phase is not locked, the drive cannot accurately determine when to fire the SCR's of the converter section to produce the desired bus voltage. Thus, it is necessary to determine whether the PLL is phase locked (block 530.) If the PLL is not phase locked, the algorithm exits (block 550.) At this point, exiting the algorithm may consist of a return directly to block 530 to continue checking for phase lock, or it may include additional steps, such as checking the number of zero crossings since the beginning of the ride-through event. If, at decision block 530, the PLL is phase locked, the algorithm then determines whether or not the drive is in PWM mode. (block 535) This is done so the algorithm can prepare to resume operation of the converter section. If the drive is in PWM mode, the bus voltage is determined, and alpha is preset to match the bus voltage (block 545.) This is done to avoid a sudden inrush of current to the capacitor bank when the input line voltage returns/increases. In the absence of this step, alpha would be at its minimum value (or at a very low value) because the bus voltage had been drawn down, and a sudden return of the line voltage would cause a corresponding sudden inrush current that would likely damage the system. By presetting alpha to a corresponding level that is only slightly higher than the actual bus voltage, the amount of time the converter's SCR's can be turned on (and the corresponding potential inrush of current) is limited. The drive can then slowly ramp up the bus voltage to its normal operating levels. Returning to decision block 535, if the drive is not in PWM mode, the algorithm causes the proportional integral controller (demand error integrator) to be preset to match the measured bus voltage (block 540) to achieve the same effect as the presetting of alpha in the PWM mode. After alpha or the proportional integral controller are preset and the converter section resumes operation, the algorithm exits (block 550.)

Figure 6:
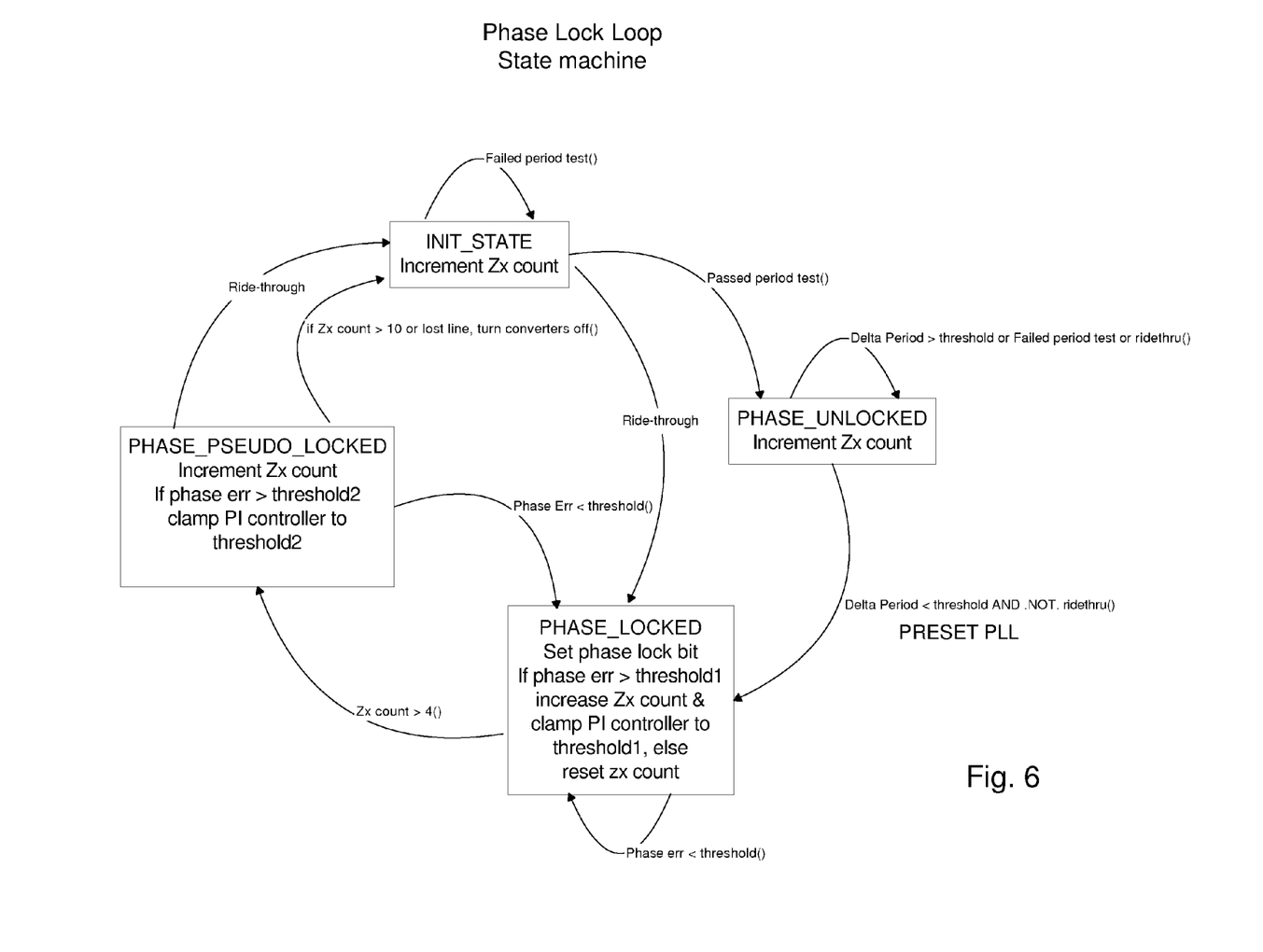
FIG. 6 is a state diagram illustrating the possible states and state transitions for a phase locked loop (PLL) in accordance with one embodiment.

Referring to FIG. 6, a state diagram illustrating the possible states and state transitions for the phase locked loop (PLL) in one embodiment is shown. As described above, it is important to be phase locked with the input line voltage so that the drive can accurately fire the SCR's of the drive's converter section. Whenever the drive is started, the PLL state machine begins in the initialization state (INIT_STATE.) Additionally, whenever a ride-through event is detected, the PLL state machine returns to the initialization state. When the PLL is in the initialization state, it determines the interval between consecutive zero crossings of the input line voltage. This is referred to in the figure as a period test. If there are no zero crossings, the interval (period) between zero crossings cannot be determined, so the period test is failed. If there are zero crossings, the period (the interval between them) is determined, and the period test is passed. The state machine then goes to the PHASE_UNLOCKED state.

In the PHASE_UNLOCKED state, the drive continues to determine the periods between successive zero crossings. If the change from one period to the next is too great, the input line voltage is unstable, and the PLL remains in the PHASE_UNLOCKED state. If the period cannot be determined (hence the period test is failed,) or if the ride-through bit is set the PLL remains in the PHASE_UNLOCKED state (although in other embodiments, these conditions might cause the PLL to return to the initialization state.) When the change between successive zero crossing periods falls below a threshold level and the ride-through bit is not set, the PLL moves to the PHASE_LOCKED state. When the PLL moves to the PHASE_LOCKED state, alpha and/or the proportional integral controller are preset. The converter section of the drive can then begin operation.

When the PLL is in the PHASE_LOCKED state, a phase lock bit is set to indicate the phase lock. If, during normal operation of the drive, the phase error of the PLL exceeds a first threshold value, this event is recorded by incrementing the zero crossing count and clamping the proportional integral controller to the first threshold. If the phase error is below the first threshold, the zero crossing count is reset. If the zero crossing count exceeds a predetermined value (4 in this instance,), the PLL moves to a PHASE_PSEUDO_LOCKED state. When the PLL is in the PHASE_PSEUDO_LOCKED state, if the phase error exceeds a second threshold, the zero crossing count is incremented and the proportional integral controller is clamped to the second threshold. If the zero crossing count exceeds a second predetermined value (10 in this example,) the PLL returns to the initialization state. If, on the other hand, the phase error falls below the first threshold, the PLL returns to the PHASE_LOCKED state. If the ride-through bit is set, the PLL moves to the initialization state, regardless of its present state.

It should be noted that the foregoing description provides the details of embodiments which are intended to be exemplary. Many variations are possible in alternative embodiments. For example, although the embodiments described above are used primarily to drive downhole submersible pumps, other embodiments could provide ride-through of power disruptions for different types of pumps, or altogether different types of equipment. In such alternative embodiments, it may be desirable to vary the parameters of operation, such as the thresholds for detecting the start or end of a ride-through event, or the amount of time after which the drive will be shut down. Alternative embodiments may also limit inrushes of current in different ways, control restart of the converter section in different ways, and so on.

Those of skill will appreciate that some of the illustrative logical blocks, modules, circuits, and algorithm steps described in connection with the embodiments disclosed herein may be implemented as electronic hardware, computer software (including firmware,) or combinations of both. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method implemented in a drive for electrical equipment, the drive having a converter section, a capacitor bank and an inverter section, the method comprising:
    detecting a beginning of a ride-through event;
    disabling the converter section of the drive in response to detecting the beginning of the ride-through event, wherein disabling the converter section comprises actively controlling the converter section to prevent the converter section from converting an AC voltage on an input line to a DC voltage at the capacitor bank;
    drawing power from the capacitor bank during the ride-through event to maintain operation of the inverter section;
    detecting an end of the ride-through event; and
    resuming operation of the converter section of the drive in response to detecting the end of the ride-through event, wherein resuming operation of the converter section comprises actively controlling the converter section to cause the converter section to convert the AC voltage on the input line to the DC voltage at the capacitor bank and to limit current flowing to the capacitor bank.

2. The method of claim 1, further comprising, upon resuming operation of the converter section, presetting a phase angle between a zero crossing of an AC input line voltage and a time at which a corresponding silicon controlled rectifier (SCR) in the converter section is turned on, wherein the phase angle is preset to a value that is determined based on a voltage across the capacitor bank at the end of the ride-through event.

3. The method of claim 1, further comprising, upon resuming operation of the converter section, presetting a demand error integrator of a proportional-integral controller to a value which is determined based on a voltage across the capacitor bank at the end of the ride-through event.

4. The method of claim 1, further comprising maintaining a filtered RMS value of a line voltage input to the converter section, wherein detecting the beginning of the ride-through event comprises detecting a reduction of the line voltage to less than about 90% of the filtered RMS value of the line voltage, and wherein detecting the end of the ride-through event comprises detecting that the line voltage is greater than about 90% of the filtered RMS value of the line voltage.

5. The method of claim 1, wherein detecting the end of the ride-through event comprises detecting that a line voltage input to the converter section has increased for a predetermined number of consecutive cycles.

6. The method of claim 1, further comprising, in response to detecting that the ride-through event has not ended after a predetermined number of cycles, shutting down operation of the drive.

7. The method of claim 1, further comprising, in response to detecting that a voltage across the capacitor bank has dropped below a predetermined voltage, shutting down operation of the drive.

8. The method of claim 1, further comprising driving a downhole pump with output power generated by the inverter section of the drive.

9. A drive system for powering electrical equipment, the system comprising:
   a converter section;
   a capacitor bank;
   an inverter section; and
   a control system configured to
      detect a beginning of a ride-through event,
      disable the converter section in response to detecting the beginning of the ride-through event, wherein the control system is configured to disable the converter section by actively controlling the converter section to prevent the converter section from converting an AC voltage on an input line to a DC voltage at the capacitor bank,
      draw power from the capacitor bank during the ride-through event to maintain operation of the inverter section,
      detect an end of the ride-through event, and
      resume operation of the converter section of the drive in response to detecting the end of the ride-through event, wherein the control system is configured to resume operation of the converter section by actively controlling the converter section to cause the converter section to convert the AC voltage on the input line to the DC voltage at the capacitor bank and to limit current flowing to the capacitor bank.

10. The drive system of claim 9, wherein the control system is configured to, upon resuming operation of the converter section, preset a phase angle between a zero crossing of an AC input line voltage and a time at which a corresponding silicon controlled rectifier (SCR) in the converter section is turned on, wherein the phase angle is preset to a value that is determined based on a voltage across the capacitor bank at the end of the ride-through event.

11. The drive system of claim 9, wherein the control system is configured to, upon resuming operation of the converter section, preset a demand error integrator of a proportional-integral controller to a value which is determined based on a voltage across the capacitor bank at the end of the ride-through event.

12. The drive system of claim 9, wherein the control system is configured to maintain a filtered RMS value of a line voltage input to the converter section, to detect the beginning of the ride-through event by detecting a reduction of the line voltage to less than about 90% of the filtered RMS value of the line voltage, and to detect the end of the ride-through event by detecting that the line voltage is greater than about 90% of the filtered RMS value of the line voltage.

13. The drive system of claim 9, wherein the control system is configured to detect the end of the ride-through event by detecting that a line voltage input to the converter section has increased for a predetermined number of consecutive cycles.

14. The drive system of claim 9, wherein the control system is configured to, in response to detecting that the ride-through event has not ended after a predetermined number of cycles, shut down operation of the drive.

15. The drive system of claim 9, wherein the control system is configured to, in response to detecting that a voltage across the capacitor bank has dropped below a predetermined voltage, shut down operation of the drive.

16. The drive system of claim 9, wherein the inverter section is coupled to a downhole pump and configured to drive the downhole pump.

* * * * *